United States Patent
Handojo

(10) Patent No.: US 8,202,389 B2
(45) Date of Patent: Jun. 19, 2012

(54) ENGINEERED WOOD FLOOR USING CORE MATERIAL WITH VERTICAL GLUE-LINE POSITION

(75) Inventor: Daniel Nugroho Handojo, Jakarta (ID)

(73) Assignee: PT. Tanjung Kreasi Parquet Industry, Jakarta (ID)

( * ) Notice: Subject to any disclaimer, the term of this patent is extended or adjusted under 35 U.S.C. 154(b) by 0 days.

(21) Appl. No.: 11/763,823

(22) Filed: Jun. 15, 2007

(65) Prior Publication Data

US 2007/0292656 A1    Dec. 20, 2007

Related U.S. Application Data

(60) Provisional application No. 60/805,251, filed on Jun. 20, 2006.

(51) Int. Cl.
  *B32B 37/00*  (2006.01)
  *B32B 37/02*  (2006.01)
  *B32B 38/00*  (2006.01)
  *B32B 38/04*  (2006.01)

(52) U.S. Cl. ......... 156/253; 156/250; 156/252; 156/256

(58) Field of Classification Search .................. 156/250, 156/256, 259, 252, 253; 428/106
See application file for complete search history.

(56) References Cited

U.S. PATENT DOCUMENTS

| | | | |
|---|---|---|---|
| 1,628,886 A * | 5/1927 | Jackson et al. | 428/106 |
| 1,722,715 A | 7/1929 | Teakle | |
| 2,732,597 A * | 1/1956 | Contratto | 52/590.2 |
| 3,977,449 A * | 8/1976 | Sadashige | 144/351 |
| 4,204,421 A | 5/1980 | Rogers et al. | |
| 4,332,384 A | 6/1982 | Hasegawa | |
| 4,471,012 A | 9/1984 | Maxwell | |
| 4,743,484 A | 5/1988 | Robbins | |
| 4,784,887 A | 11/1988 | Abendroth | |
| 4,810,551 A * | 3/1989 | Chu | 428/106 |
| 5,034,259 A | 7/1991 | Barker | |
| 5,234,747 A * | 8/1993 | Walser et al. | 428/215 |
| 5,597,024 A * | 1/1997 | Bolyard et al. | 144/369 |
| 6,050,047 A | 4/2000 | Covelli et al. | |
| 6,162,312 A * | 12/2000 | Abney | 156/154 |
| 6,428,871 B1 | 8/2002 | Cozzolino | |
| 2004/0226243 A1 | 11/2004 | Lin et al. | |
| 2005/0069674 A1* | 3/2005 | Chang | 428/106 |
| 2005/0166516 A1* | 8/2005 | Pervan | 52/589.1 |
| 2006/0123731 A1 | 6/2006 | Eisermann | |

* cited by examiner

*Primary Examiner* — Philip Tucker
*Assistant Examiner* — Christopher C Caillouet
(74) *Attorney, Agent, or Firm* — Kilpatrick Townsend & Stockton LLP

(57) ABSTRACT

A composite board comprising a first layer having an orientation and a second layer bonded to the first layer where the second layer comprises a plurality of wooden veneer structures, each wooden veneer structure is substantially perpendicular to the orientation of the first layer.

13 Claims, 12 Drawing Sheets

ENGINEERED WOOD FLOOR USING CORE MATERIAL WITH VERTICAL GLUE-LINE POSITION

CROSS-REFERENCES TO RELATED APPLICATIONS

This application is a non-provisional of, and claims the benefit of the filing date of U.S. Provisional Patent Application No. 60/805,251, filed on Jun. 20, 2006, which is herein incorporated by reference in its entirety for all purposes.

TECHNICAL FIELD OF INVENTION

The invention generally relates to engineered wood materials, and more specifically relates to a composite board with an outer layer bonded to a wood veneer composite core composed of slats arranged with their glue lines in a vertical orientation.

BACKGROUND OF THE INVENTION

Types of Wood Floor Boards:

At present, the available options for wood floor boards are solid wood floor, engineered wood floor, and thin veneer or laminate High Density Fiberboard (HDF) floor.

Solid wood floor is generally known as a higher price product, manufactured from solid block of timber. Solid wood floor is known to have less stability in climate change due to the inherent swelling-shrinking nature of wood. Solid wood floor is typically available in irregular sizes, with random widths and lengths. Though a solid wood floor can be installed using various different installation methods, their irregular sizes may prohibit certain installation types.

Engineered wood floor is typically manufactured to have the visual appearance of solid wood floor, and yet has better stability in climate change owing to the multiple directions of layers' grain. Its construction comprises noble wood top layer bonded to substrate material, to obtain the visual appearance and the surface durability of solid wood floor, which simultaneously have the structural integrity, stability and mechanical strength of engineered wood panel. The substrate material types differentiate engineered wood floor into: lumber-base engineered wood floor and plywood-base engineered wood floor. Engineered wood floor is manufactured in standard sizes and can be installed using any of the variety of installation types. Moreover, engineered wood floor does not need acclimatization, unlike solid wood floor which needs weeks of acclimatization prior to installation.

Laminate floor is typically mass produced and is manufactured and sold as an economical look-alike substitute for real wood floor. Laminate floor is manufactured from HDF (high density fiber) board with printed paper or film overlay on top, or alternatively, it may have a thin slice of wood veneer as a top layer. The mass production of laminate floors creates the market perception of a generic floor-covering product rather than a real wood flooring product.

Types of Lumber-base Engineered Wood Floor:

2-two layer lumber-base engineered wood floor is manufactured from noble wood top layer in long grain direction, and core layer of lumber slats assembled with grain direction across the top layer's grain.

3-layer lumber-base engineered wood floor is a configuration noble wood top layer in long grain direction, core layer lumber slats assembled with grain direction across the top layer's, and back layer of either wood veneer or laminated sawn lamellas with grain direction parallel to the top layer's grain.

Generally, the core layer is prepared from a range of coniferous/softwood species and tropical broad leaf/hardwood species. The lumber milling process produces various cutting directions: flat, quarter, semi quarter or rift sawn lumber slats. The mixed cutting directions of slats in the assembled core layer hardly gives a predictable dimensional stability characteristics in relation to the material's random shrinking-swelling directions, whilst the moisture content of the individual piece can hardly be homogeneous in relation to the drying time of the lumber pieces which have various cutting directions. This often creates the so called 'telegraphic effect', a wavy impression on the top layer's surface.

BRIEF SUMMARY OF THE INVENTION

Certain features of the present invention may reduce or eliminate drawbacks and problems associated with prior engineered wood material systems. For example, slats produced from a wood veneer composite material can be arranged with the glue line in vertical position. This arrangement resembles quarter sawn natural lumber and provides improved dimensional stability and structural integrity over prior wood veneer composite slats. In another example, the wood veneer composite material can be constructed from layers of thin veneers with substantially uniform thickness and moisture content. This construction may improve stability as well as other characteristics.

Certain embodiments of the invention are especially well suited for constructing and manufacturing lumber-based engineered wood floor boards. It should be understood, however, that some embodiments may also be practically useful for constructing and manufacturing other types of building materials, such as wall and ceiling panels.

One embodiment of the invention is a composite board with a first layer having an orientation. The composite board also includes a second layer bonded to the first layer. The second layer includes a plurality of wooden veneer structures. Each of the veneer structures is substantially perpendicular to the orientation of the first layer.

Another embodiment of the invention is a method of making a composite board. This method provides a first layer with an orientation. A second layer is assembled by arranging a plurality of wooden veneer structures so that each wooden veneer structure is substantially perpendicular to the orientation of the first layer. The first layer is bonded to a first surface of the second layer.

Embodiments of the invention may provide one or more technical advantages.

A technical advantage of one embodiment may be providing an engineered wood floor board with the visual appearance and surface durability of a solid wood floor.

Another technical advantage of one embodiment may be manufacturing, assembling, and conditioning processes that produce engineered wood floor boards with better dimensional stability, structural integrity, surface durability, and mechanical strength than existing wood floor boards, manufactured in either solid or engineered wood.

In addition, a technical advantage of one embodiment may be improved dimensional stability. For example, a vertical glue line at each interface between layers in the wood veneer composite core provides a moisture barrier which helps protect the board from moisture intrusion and may prevent warp, twist, and other dimensional variations.

Another technical advantage of one embodiment may be reduced processing costs, improved yield and reducing cost of core material, as well as reduced finished product weight. Processing wood veneer composite out of rotary peeled veneer produces minimal sawdust and yields much higher material recovery as compared to processing sawn lumber. In addition, the drying time of wood veneer composite is much shorter than the drying time of lumber kiln drying. Wood veneer composite is also more evenly dried than natural wood due to its consistent properties.

Another technical advantage of one embodiment may be improved consistency and stability, better profile precision and appearance, and a more favorable sound level.

A technical advantage of one embodiment may be a design that is environmentally friendly by using sustainable and readily available plantation wood species, either softwood or hardwood, for the wood veneer composite material. Prior systems use coniferous/softwood or tropical broad leaf/hardwood species, whilst the present invention may utilize any plantation wood species which are environmentally sustainable.

A technical advantage of one embodiment may be providing foreseeable stability characteristics. For example, lumber-based engineered wood floor with core material made of wood veneer composite slats arranged with the glue line in a vertical position has a consistent cutting direction resembling quarter sawn natural lumber slats. As the result, the wood veneer composite core assembly has foreseeable stability characteristics—the utmost important property of wood— and any problems relating to core stability can then be anticipated and excluded. Additionally, in wood veneer composite core with unidirectional wood grain, precise and very smooth tongue-and-groove profile will be produced.

Certain embodiments of the invention may include none, some, or all of the above technical advantages. One or more other technical advantages may be readily apparent to one skilled in the art from the figures, descriptions, and claims included herein.

DETAILED DESCRIPTION OF THE INVENTION

Figure 1:
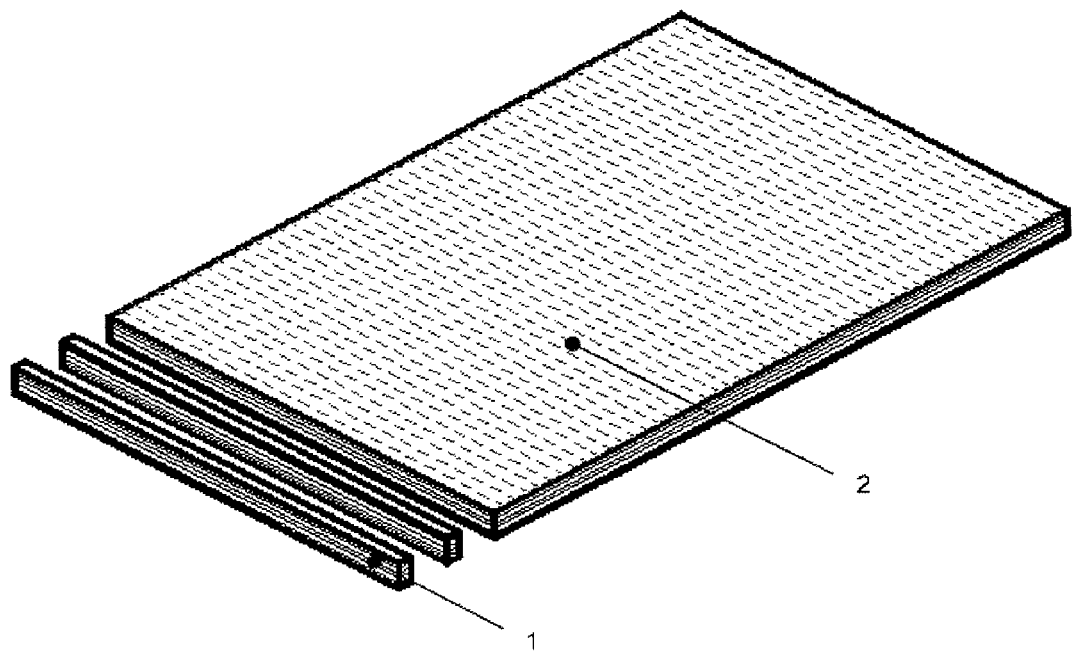
FIG. 1 illustrates slat sticks (1) cut off from wood veneer composite panel (2) in rip sawing process.

Certain embodiments of the present invention may reduce or eliminate the drawbacks of existing wood floors, by providing a lumber-base engineered wood floor with a unique core layer material, which can simultaneously provide high surface durability, structural integrity and strength with high material stability, and yet maintain a competitive price against other wood floor products in the same category.

The Present Invention Relates to:

a. 2-layer engineered wood floor comprises of top layer/wear layer with a thickness of 2.0 to 6.0 mm of either single piece sawn cut veneer or strips of whole length sawn cut veneer; slats core layer in a thickness of 5.0 to 14.0 mm and in a width of 12 to 50 mm of wood veneer composite specifically arranged with the glue line in vertical position. The assembly has final total thickness of 6.0 to 22 mm, its four sides are molded into tongue-and-groove profile, with either squared or beveled edges. On some particular reasons slats of any other substrate material may be put at the short ends of the floor board and/or may also be inserted in amongst the wood veneer composite slats within the core layer.

b. 3-layer engineered wood floor is an assembly of top layer/wear layer with a thickness of 2.0 to 6.0 mm of either single piece sawn cut veneer, strips of sawn cut veneer, or thin lamellas composed together; slats core layer in a thickness of 5.0 to 14.0 mm and in a width of 12 to 50 mm of wood veneer composite specifically arranged with the glue line in vertical position; and back layer with a thickness of 1.5 to 6.0 mm of either rotary cut veneer or thin lamellas composed together. The assembly has final total thickness of 8.0 to 24 mm, its four sides are molded either into mechanical locking profile or traditional tongue-and-groove profile, with either squared or beveled edges. On some particular reasons slats of any other substrate material may be put at the short ends of the floor board and/or may also be inserted in amongst the wood veneer composite slats within the core layer.

c. Multi-layer engineered wood floor consists of top layer/wear layer with a thickness of 2.0 to 6.0 mm of either single piece sawn cut veneer, strips of sawn cut veneer, or thin lamellas composed together; middle layer(s) which can either be wood veneer, thin HDF/MDF board, thin plywood or any other substrate material with a thickness of 1.5 to 10.0 mm; slats core layer in a thickness of 5.0 to 14.0 mm and in a width of 12 to 50 mm of wood veneer composite specifically arranged with the glue line in vertical position; and back layer with a thickness of 1.5 to 6.0 mm of either rotary cut veneer or thin lamellas composed together. Multi-layer wood floor can either have two middle layers, one on top of the slats core layer and the other one below the slats core layer; or only one middle layer, either on top of the slats core layer or below the slats core layer. The assembly has final total thickness of 10.0 to 28 mm, its four sides are molded either into mechanical locking profile or traditional tongue-and-groove profile, with either squared or beveled edges. On some particular reasons slats of any other substrate material may be put at the short ends of the floor board and/or may also be inserted in amongst the wood veneer composite slats within the core layer.

Figure 2:
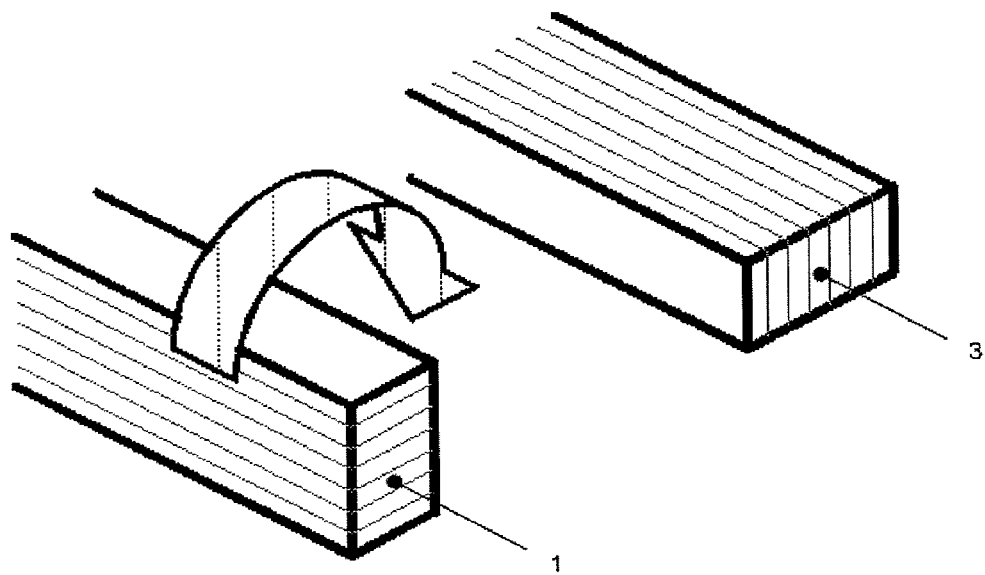
FIG. 2 schematically shows a slat stick (1) which has horizontal glue lines being flipped over to position it into slat stick (3) with vertical glue lines.

The slats of the core layer are manufactured from wood veneer composite panel with layers of rotary cut veneer in 1.5 to 6.0 mm thickness bonded together with heat cured phenol glue. The 8.0 to 50 mm thick wood veneer composite panel is cut into slat sticks (See FIG. 1) in rip sawing process which in turn are then arranged with the glue line in vertical position (See FIG. 2).

The wood veneer composite panel constitutes of layers of homogeneous or mixed wood species veneer laid one over the other in unidirectional grain direction, commonly known as LVL (laminated veneer lumber). Alternatively the wood veneer composite panel can also constitute of wood veneer layers in unidirectional grain directional, sandwiched between HDF/MDF (high or medium density fiber) boards known as LVS (laminated veneer sandwich). The wood veneer composite can also be constructed in a combination of unidirectional and cross directional grain direction known as LVB (laminated veneer board) or in alternating cross directional grain direction known as plywood.

The arrangement of the slats with vertical glue line position is designed to provide resemblance to quarter sawn natural lumber, known to have superior stability as compared to lumber with other cutting directions.

The choice of wood veneer composite material is intended to obtain higher yield of wood material with remarkable shorter drying time. Cutting wood material into rotary peeled veneer yields much higher recovery as compared to processing sawn lumber. Also, the processing time with concern to drying process is much shorter in thin veneer drying as compared to drying sawn lumber in kiln dryer, not to mention the more homogeneous result of moisture content level in thin veneer drying. Reduced drying times may reduce the amount of core material that must be kept in inventory.

In the molding process of the wood floor boards' four edges, wood veneer composite with unidirectional grain gives additional advantage of producing particularly precise and smooth profile.

Additionally, wood veneer composite can be manufactured from sustainable plantation wood species, whilst the usually unfavorable density of the plantation wood species will be sufficiently elevated to the required level by the density of the layers of glue line. Further, the less dense wood material theoretically will act as sound absorber to give a more favorable sound level to the finished product. In some cases, the wood veneer composite may be manufactured from plantation wood species that are ten to fifteen years old. In other cases, inexpensive wood can be used to produce the wood veneer composite to minimize material costs.

Figure 3:
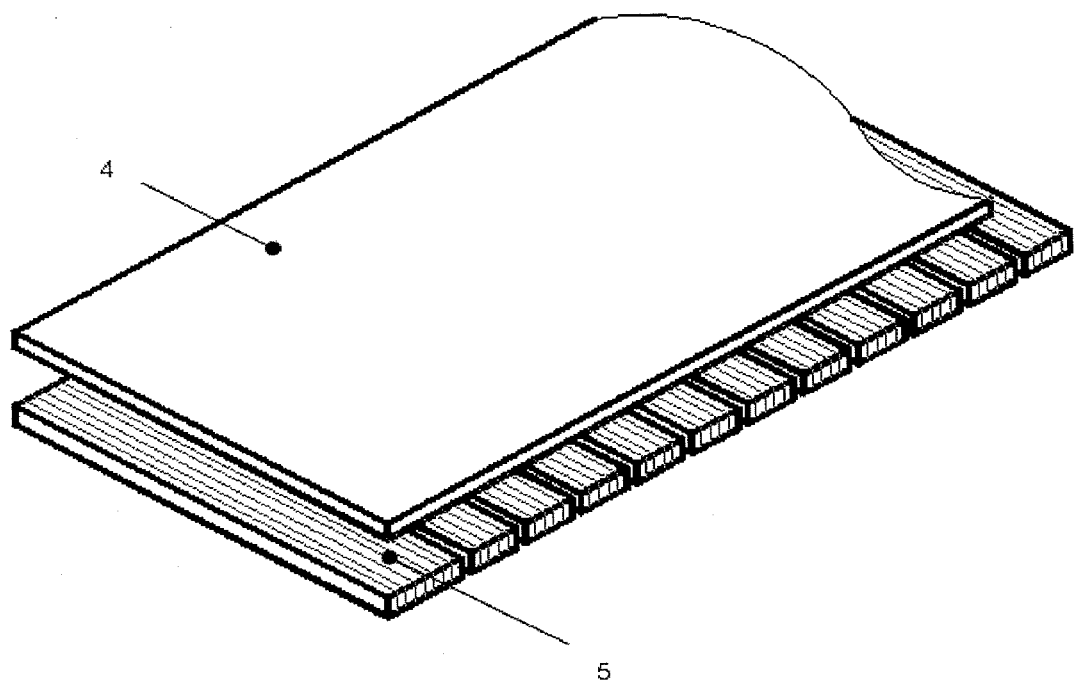
FIG. 3 depicts the configuration of 2-layer engineered wood flooring, constituted of top layer/wear layer (4) and wood veneer composite slats (5) arranged in vertical glue line position.
Figure 4:
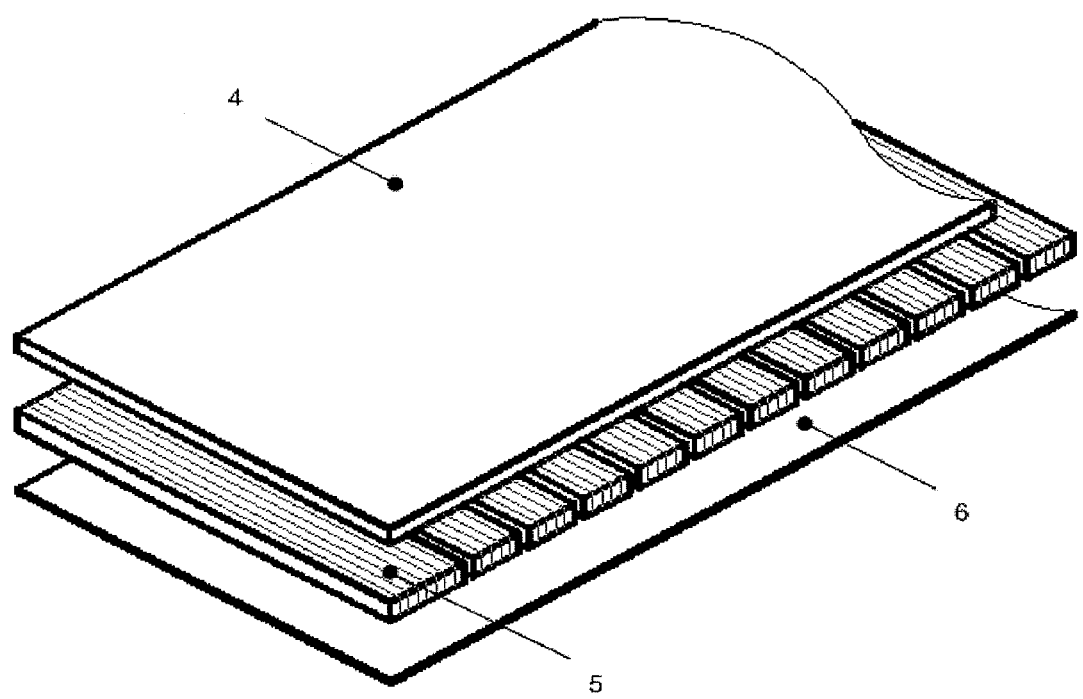
FIG. 4 shows the configuration of 3-layer engineered wood floor which is constructed from top layer/wear layer (4), wood veneer composite slats (5) arranged in vertical glue line position, and back layer (6).
Figure 5:
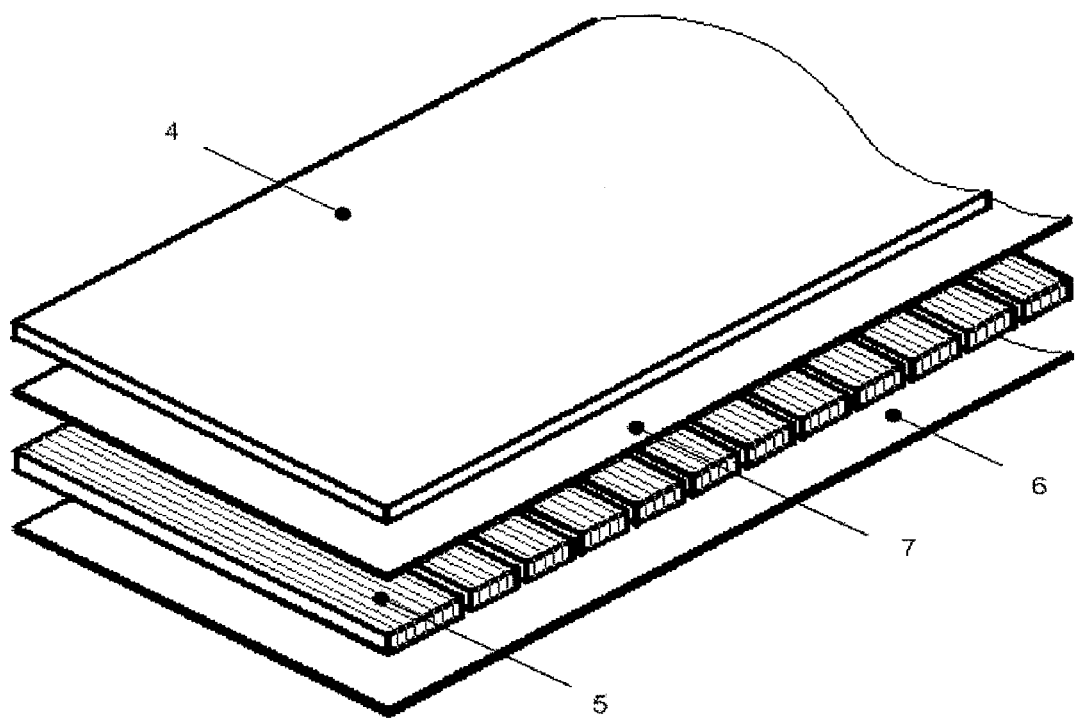
FIG. 5 represents the configuration of multi-layer engineered wood floor consisting layers of top layer/wear layer (4), middle layer (7), wood veneer composite slats (5) arranged in vertical glue line position, and back layer (6) wherein the middle layer (7) can either be wood veneer, thin HDF/MDF board, thin plywood or any other substrate material, and can be positioned in between the top layer/wear layer (4) and the slats core layer (5), or in between the slats core layer (5) and back layer (6).
Figure 6:
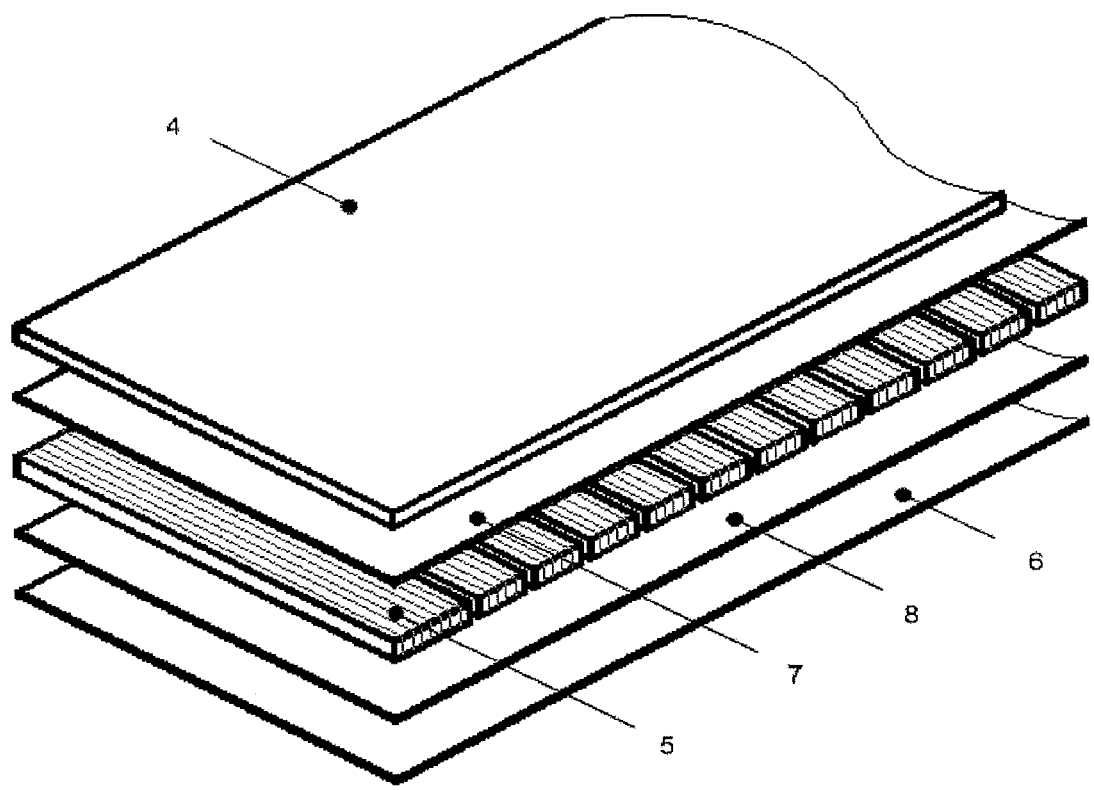
FIG. 6 is an illustration of multi-layer engineered wood floor which is constructed from top layer/wear layer (4), middle layer (7), wood veneer composite slats (5) arranged in vertical glue line position, middle layer (8), and back layer (6) wherein the middle layer (7) and (8) can either be wood veneer, thin HDF/MDF board, thin plywood or any other substrate material.

The slats being cut off from the wood veneer composite panel in rip sawing process and flipped over to have their glue line in vertical position are then assembled together with the top layer/wear layer to construct 2-layer engineered wood floor boards (See FIG. 3), or with the top layer/wear layer to construct 3-layer engineered wood floor boards (See FIG. 4), or with the top layer/wear layer, middle layer(s) and back layer to construct multi-layer engineered wood floor boards (See FIG. 5 and FIG. 6).

Figure 7:
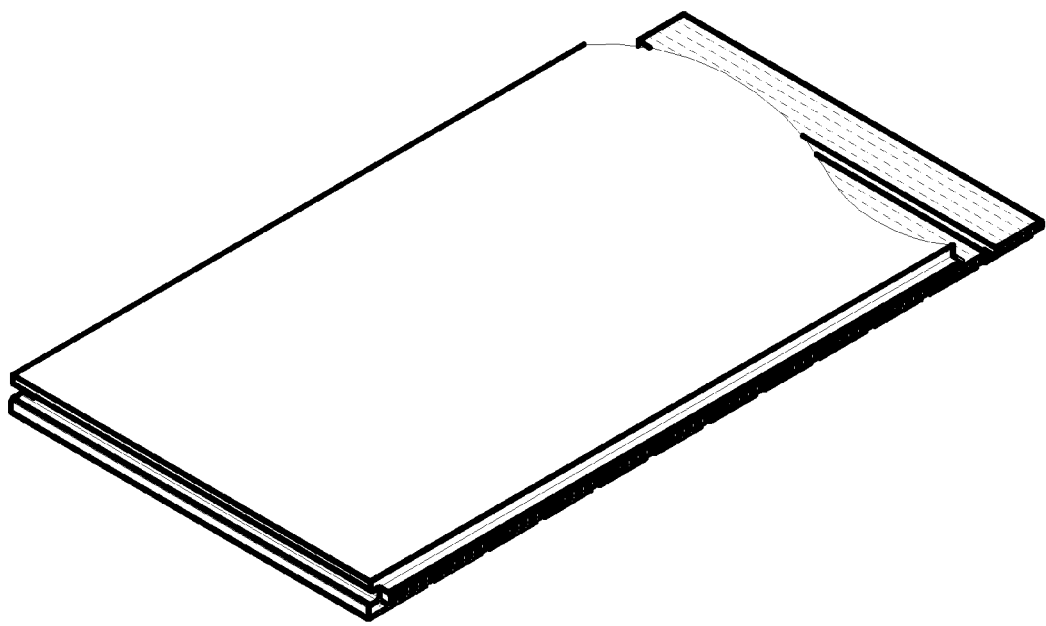
FIG. 7 is a picture of assembled board of 2-layer engineered wood floor with its four sides molded into tongue-and-groove profile.

In 2-layer construction, the top layer/wear layer is laid in its long grain direction over the wood veneer composite slats already arranged with their glue line in vertical position in their grain direction across the top layer/wear layer's grain direction. The layers are assembled and joined together with glue, cured under high pressure to give strong bonding. The assembled board is then further processed to have the four sides profiled with tongue-and-groove profile (See FIG. 7).

Figure 8:
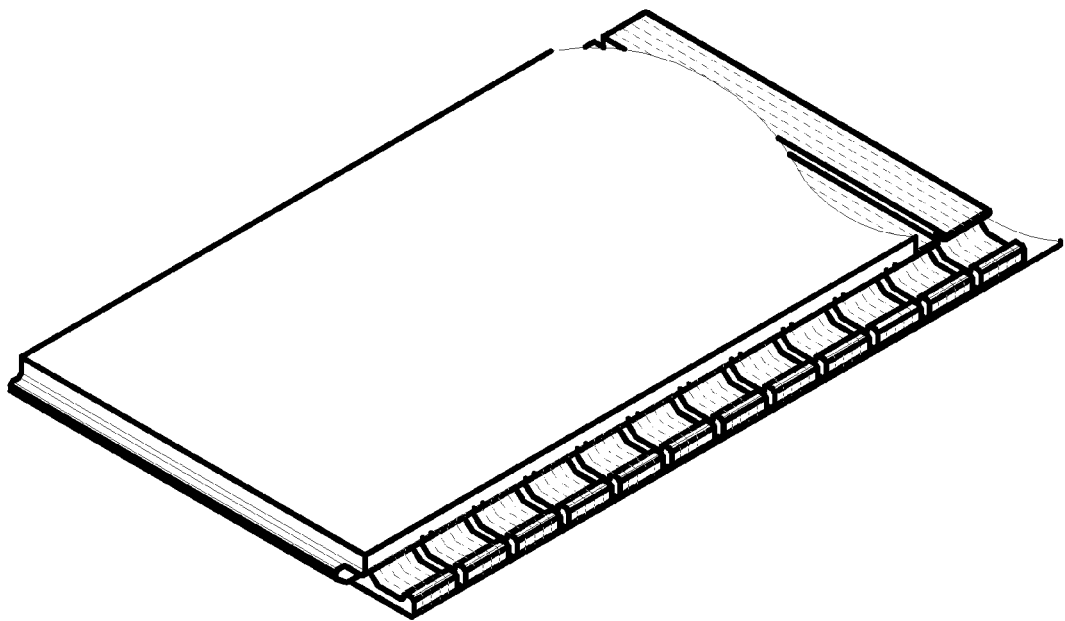
FIG. 8 is a graphic representation of the assembled 3-layer or multi-layer engineered wood floor board with four sides molded either into mechanical locking profile or traditional tongue-and-groove profile.

In 3-layer construction, the bottom layer of either rotary cut veneer or composed thin lamellas is laid in their long grain direction. The wood veneer composite slats are laid over with their glue line in vertical position, with their grain direction across the back layer's grain direction. The top layer/wear layer is positioned in long grain direction in alignment with the back layer's direction. The layers are assembled and joined together with glue, cured under high pressure to give strong bonding. The assembled board is then further processed to have the four sides profiled either with mechanical locking profile (See FIG. 8) or traditional tongue-and-groove profile.

In multi-layer construction, the bottom layer of either rotary cut veneer or composed thin lamellas is laid in their long grain direction. Middle layer may be put on top of the back layer; wood veneer or plywood back layer can be laid either in long or cross grain direction. The wood veneer composite slats are laid over with their glue line in vertical position, with their grain direction across the back layer's grain direction. Another middle layer may be put on top of the slats core layer; wood veneer or plywood back layer can be laid either in long or cross grain direction. The top layer/wear layer is positioned in long grain direction in alignment with the back layer's direction. The layers are assembled and joined together with glue, cured under high pressure to give strong bonding. The assembled board is then further processed to have the four sides profiled either with mechanical locking profile (See FIG. 8) or traditional tongue-and-groove profile.

Factory applied surface finish is put on the final assembled boards to produce pre-finished engineered wood floor, ready be installed. The surface finish applied can either be UV (ultra violet) cured lacquer or oil.

The ready to install wood floor boards come in the size ranges of:
  Length 500 to 2,300 mm
  Width 70 to 250 mm
  Thickness 6.0 to 22 mm for 2-layer construction or 8.0 to 24 mm for 3-layer construction or 10.0 to 28 mm for multi-layer construction.

In some embodiments, the process of making the lumber-base engineered wood floor includes specifically designing and utilizing wood veneer composite for core layer material of the lumber-base engineered wood floor. The core layer material is cut into slats specifically arranged with the glue line in vertical position to resemble natural lumber slats with quarter sawn cutting direction. The core layer is bonded with specific bonding material to form a 2-layer assembly of noble wood top layer and wood veneer composite core layer, or a 3-layer assembly of noble wood top layer, wood veneer composite core layer, and wood veneer or laminated sawn lamellas back layer, or a multi-layer assembly of noble wood top layer, wood veneer composite core layer, and wood veneer or laminated sawn lamellas back layer, plus wood veneer layer either between the top layer and the core layer or between the core layer and the back layer.

Methods of making the lumber-base engineered wood floor may include manufacturing, assembling, conditioning, and other processing of the lumber-base engineered wood floor and components thereof.

The composition, construction and manufacturing process of the lumber base engineered wood floor of the present invention, provides the wood floor with certain advantages mentioned in the disclosure and elsewhere.

Various modification, dimension alteration or variations of the invention will be acceptable as long as they are within the scope of this invention as being claimed in the appended claims.

Test Results

As shown below, test results demonstrate that a sample representing an embodiment of the invention (Core 1) may have some improved properties over existing engineered wood floor boards (Core 2, 2P, 3P, 5P). The properties tested include static locking strength, resistance to changing climates, thermal conductivity, bonding quality, impact sound insulation, and room acoustical properties. The tests were conducted on the following samples of engineered wood floor board:

Sample of an engineered wood floor board representing an embodiment of the invention with core of wood veneer composite slats (Core 1)

Sample of engineered wood floor board made of mixed light hardwood core (Core 2). This core is made of solid wood slats.

Sample of a first product on the market with 14 mm engineered wood floor board and spruce wood core (2P)

Sample of a second product on the market with 14 mm engineered wood floor board and spruce wood core (3P)

Sample of a third product on the market with 14 mm engineered wood floor board and spruce wood core (5P)

Static Locking Strength (Mechanical Property)

Static locking strength tests were performed based on the ISO 24334 standard using a TIRA test 24100 machine. The TIRA test 24100 machine applied a compression load of 10 N to open a joint at a rate of 0.5 mm/min until the joint opened.

The results of the static locking strength tests are shown in Table 1. According to these results, the Core 1 sample representing an embodiment of the invention has improved static locking strength (long side joints) over the Core 2 sample with mixed light hardwood core. The higher long side locking strength of the Core 1 sample leads to smaller maximum openings of the long side under changing climates which leads also to higher quality of the connection system.

TABLE 1

Static locking strength (long side joints)

| Sample | Maximum static locking strength, N | | | Static locking strength (N/m) | | |
|---|---|---|---|---|---|---|
| | $\bar{x}$ | s (mean variation) | v | $\bar{x}$ (average value) | s | v (variation coefficient) |
| Core 1 | 330 | 30.0 | 9.2 | 291/1455 | 31.6/162 | 10.9 |
| Core 2 | 320 | 61.0 | 19.1 | 253/1265 | 96.6/495 | 38.1 |

There are no static locking strength requirements for engineered wood floor boards. The static locking strength (long side) requirement for laminate floor covering according to ISO/TC 219/WG 03/N 94 Rev. 2 is 1000 N/m. The following table compares the locking strengths of the Core 1 and Core 2 samples to the static locking strength (long side) requirement for laminate floor covering.

TABLE 2

Static locking strength (long side joints) compared to requirement for laminate floor covering

| Sample | Property | Result | Requirements according to ISO/TC 219/WG 03 |
|---|---|---|---|
| Core 1 | Locking strength $F_{0.21}$ | 1455 N/m | fulfilled |
| Core 2 | (long side joints) | 1265 N/m | fulfilled |

Resistance to Changing Climates

Tests to determine the resistance to changing climates of the samples were carried out in a climatic chamber referring ISO 24339. The total test surface area was 6 m² (2 m×3 m). The following climate was realized:

1 week normal climate of 50% rel. humidity and 23° C.
2 weeks moist climate of 85% rel. humidity and 23° C.
4 weeks dry climate of 30% rel. humidity and 23° C.

The following parameters were weekly measured:

Flatness over the panel width
Height differences between the elements
Joint opening between the elements
Dimension variations of the total test surface area over the length and the width
Flatness over the total test surface area
(The measurement of this parameter was carried with a measuring roller).

Figure 9:
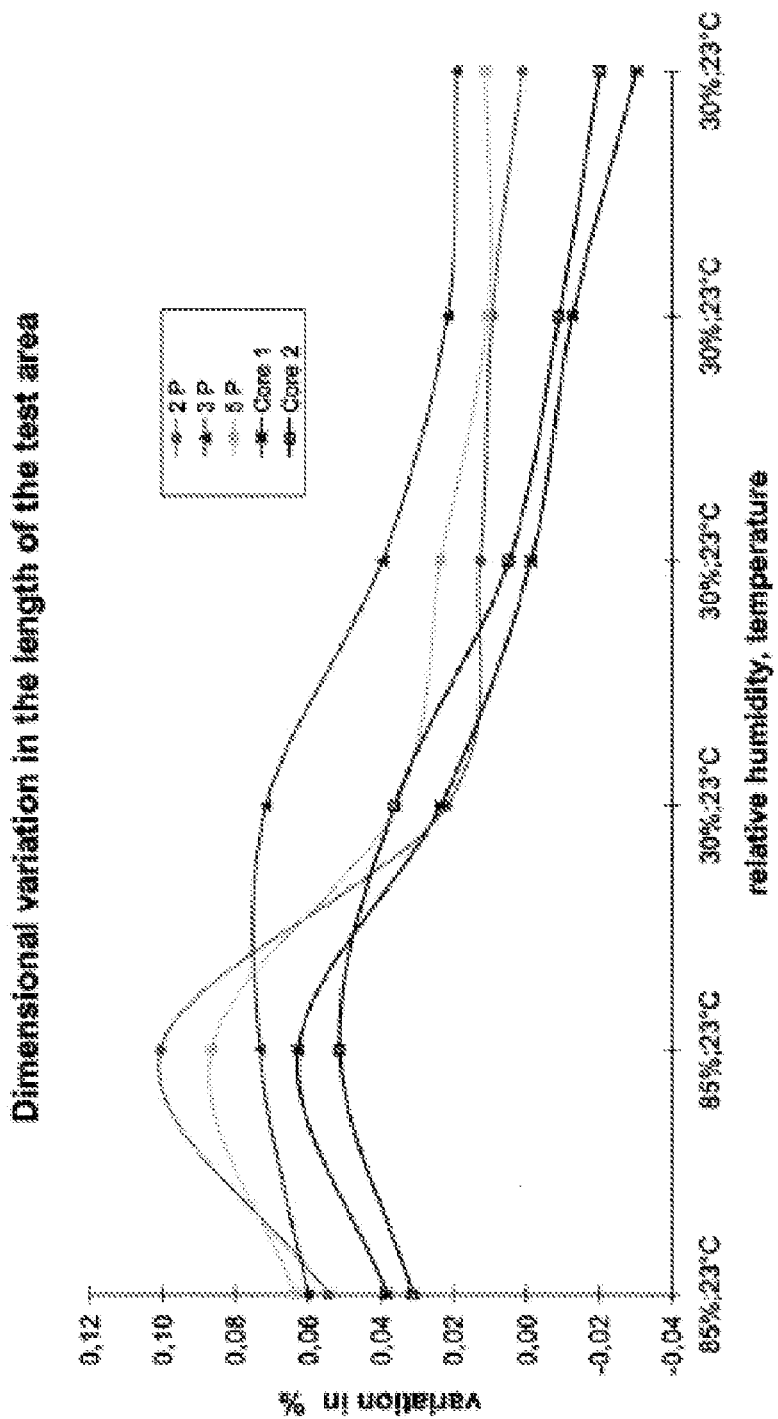
FIG. 9 is a graph illustrating the dimensional variation in the length of the test area for the test samples of engineered wood floor board.
Figure 10:
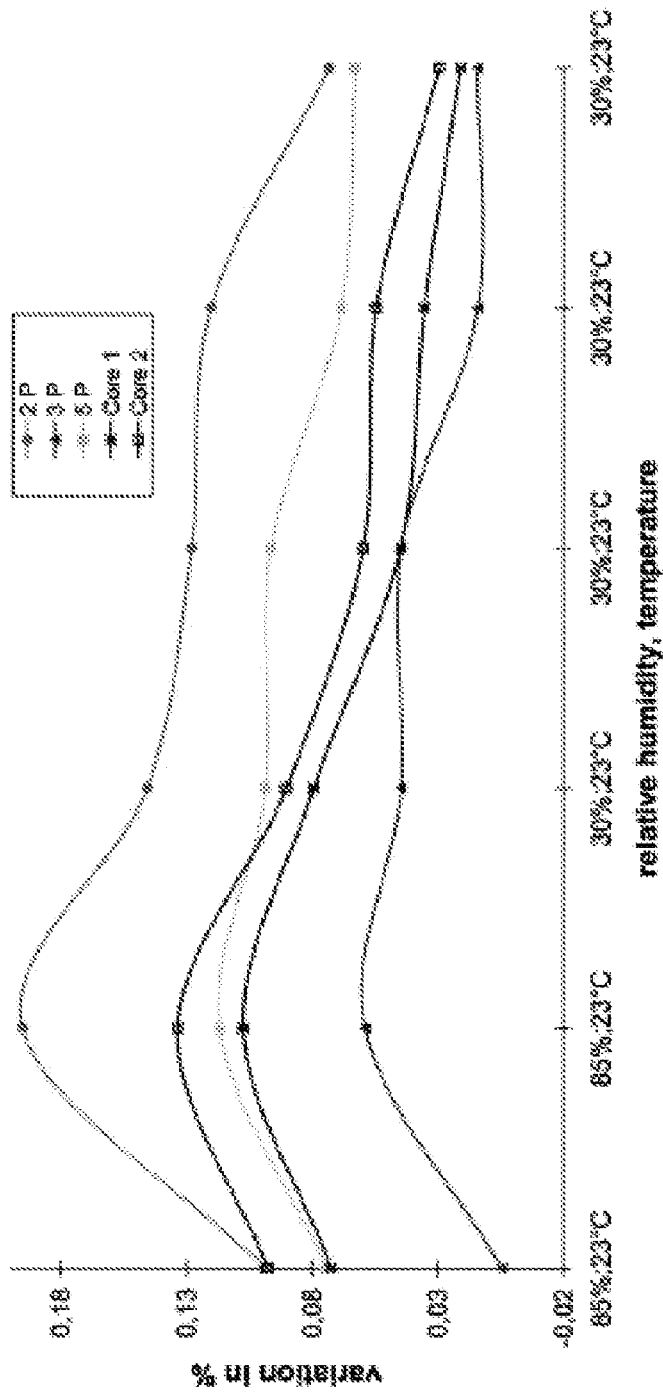
FIG. 10 is a graph illustrating the dimensional variation in the width of the test area for the test samples of engineered wood floor board.
Figure 11:
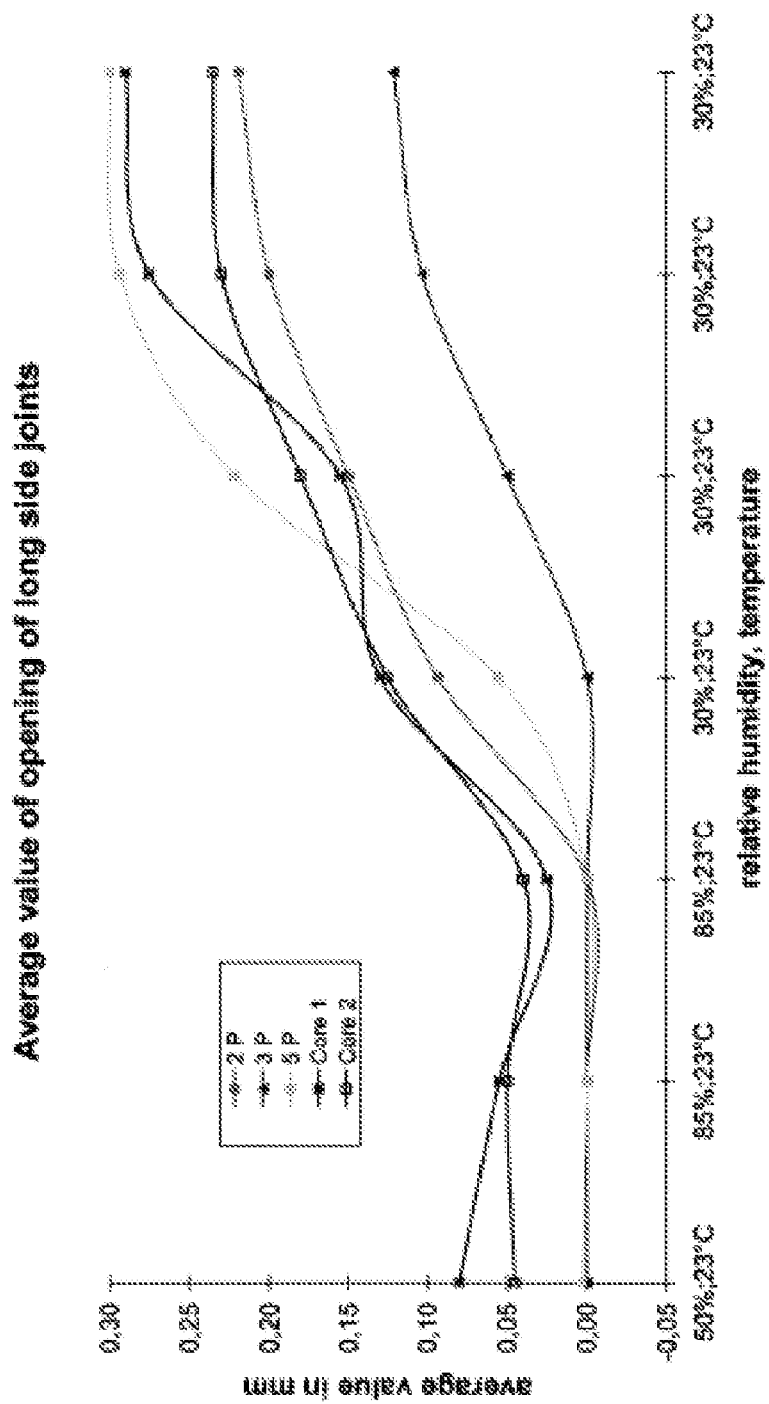
FIG. 11 is a graph illustrating the average value of opening of long side joints for the test samples of engineered wood floor board.
Figure 12:
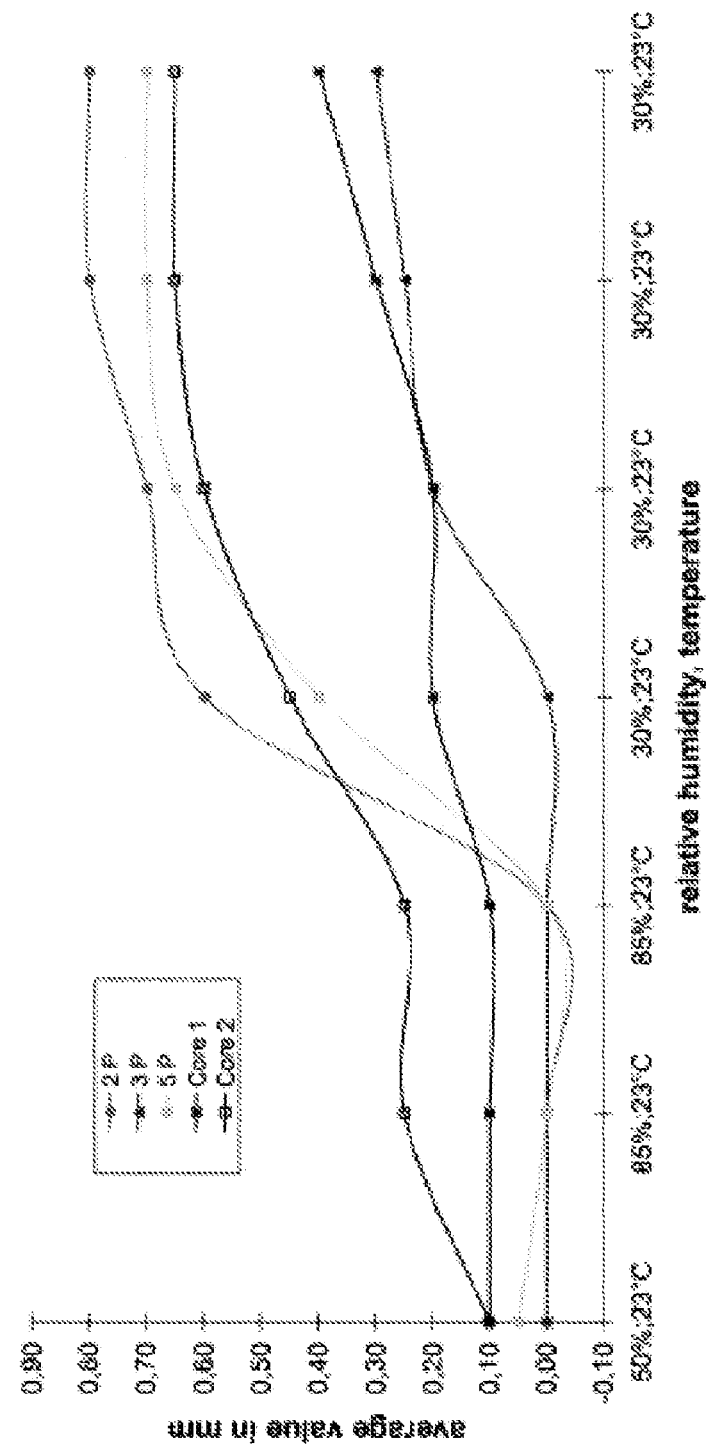
FIG. 12 is a graph illustrating the maximum value of opening of long side joints for the test samples of engineered wood floor board.
Figure 13:
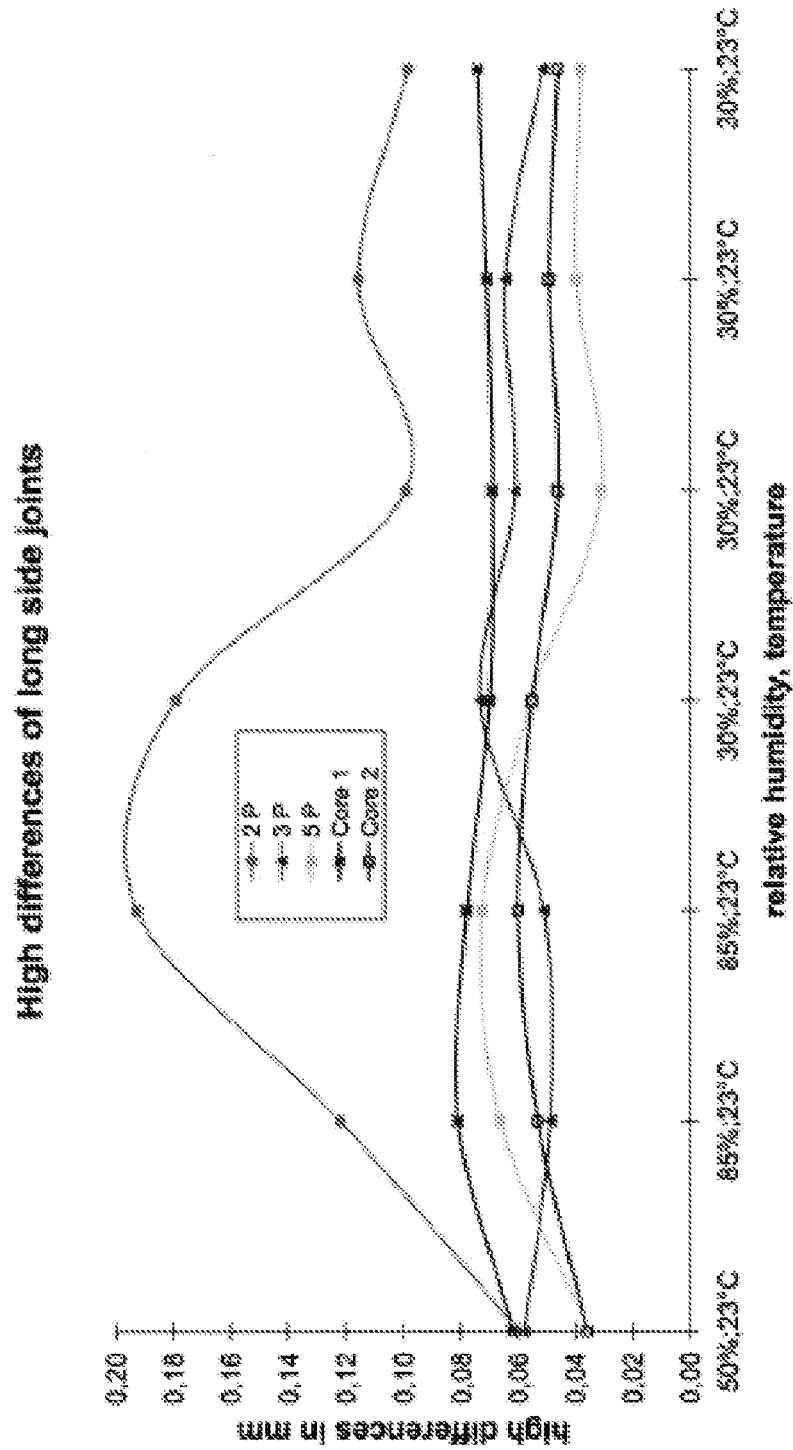
FIG. 13 is a graph illustrating the height differences of long side joints for the test samples of engineered wood floor board.
Figure 14:
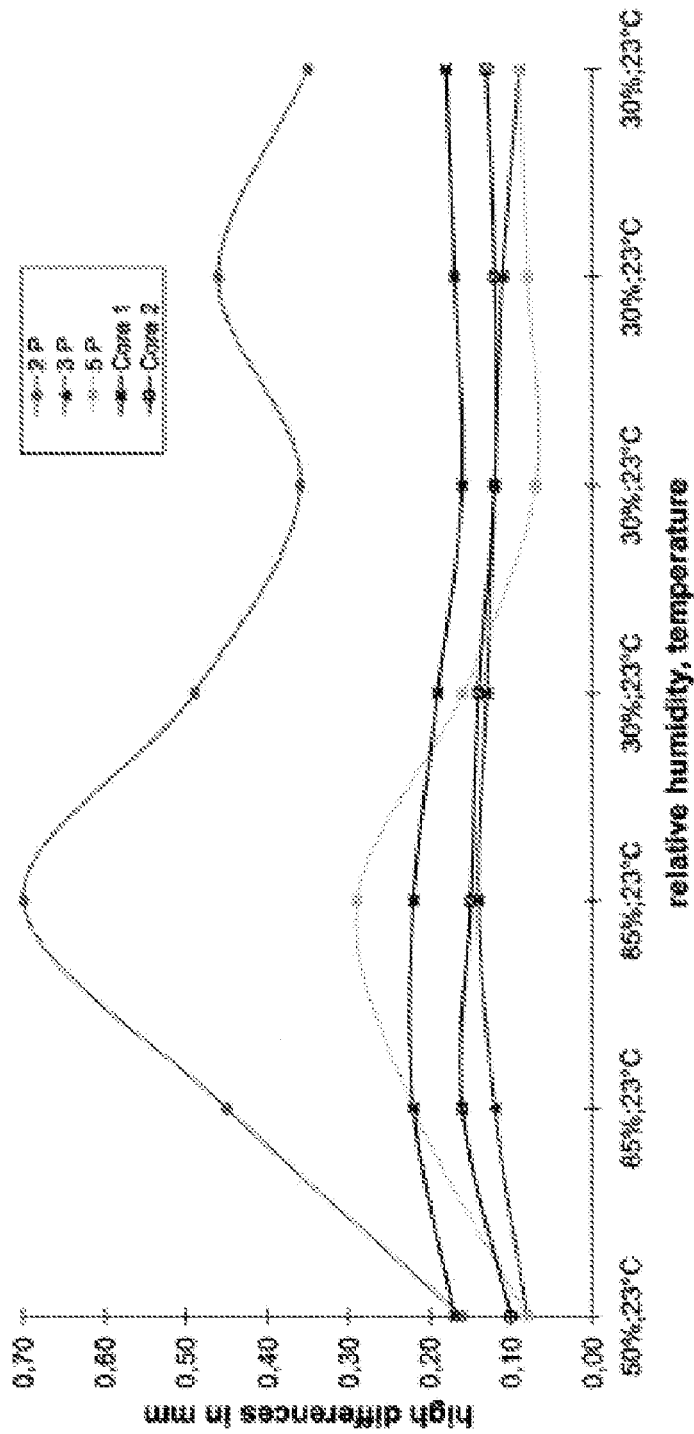
FIG. 14 is a graph illustrating the maximum height differences of long side joints for the test samples of engineered wood floor board.
Figure 15:
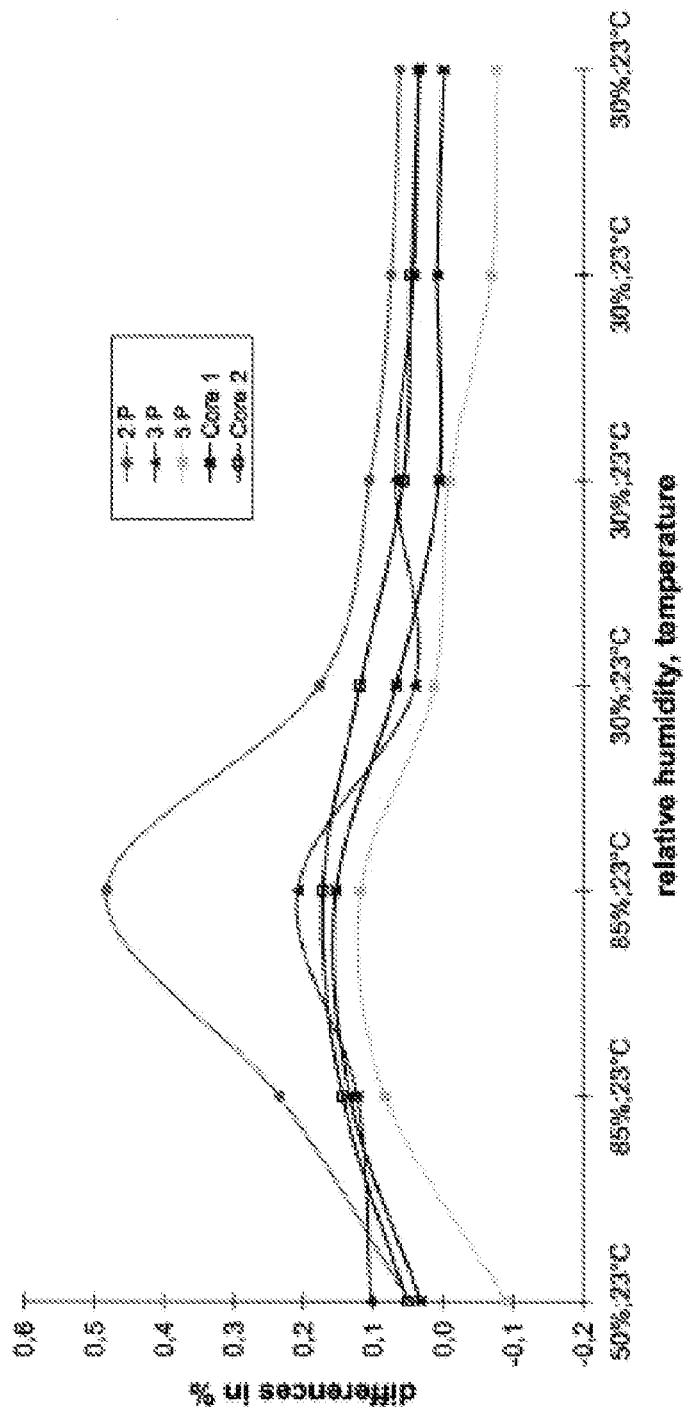
FIG. 15 is a graph illustrating the average value of the flatness over panel width for the test samples of engineered wood floor board.
Figure 16:
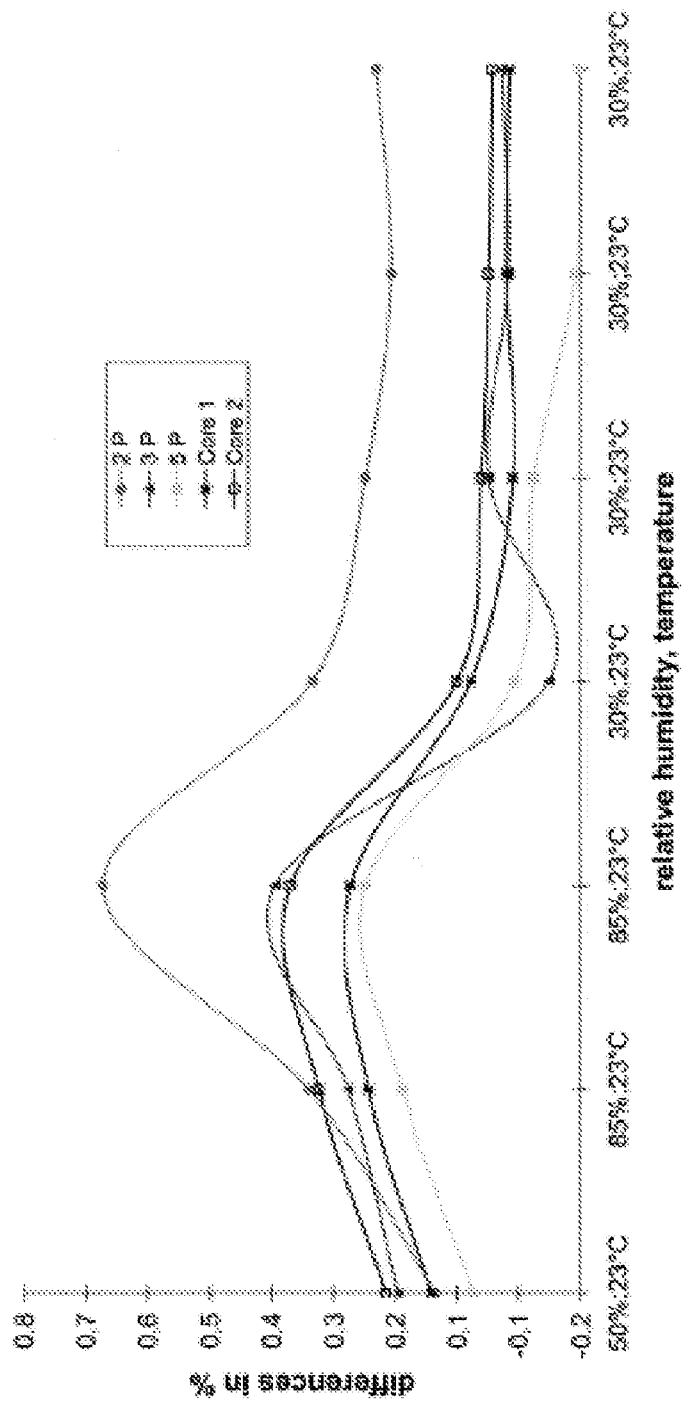
FIG. 16 is a graph illustrating the maximum value of the flatness over panel width for the test samples of engineered wood floor board.

FIGS. 9-16 include graphs that show the results from the resistance to changing climates tests on the Core 1, Core 2, 2P, 3P, and 5P samples. FIG. 9 is a graph illustrating the dimensional variation in the length of the test area for the test samples of engineered wood floor board. FIG. 10 is a graph illustrating the dimensional variation in the width of the test area for the test samples of engineered wood floor board. FIG. 10 shows that the Core 1 sample did not vary in width of the test area as much as the Core 2, 2P, and 5P samples and did vary more than the 3P sample. Thus, the Core 1 sample representing an embodiment of the invention showed less variation in width when subjected to changing climates as compared to the Core 2, 2P, and 5P samples. FIGS. 11 and 12 are graphs illustrating the average and maximum values of the opening of long side joints test for the samples. FIG. 12 shows that the Core 1 sample representing an embodiment of the invention has a lower maximum value of opening of long side joints than the Core 2 sample. FIGS. 13 and 14 are graphs illustrating the average and maximum values of height differences of long side joints for the test samples. FIGS. 15 and 16 are graphs illustrating the average and maximum values of flatness variation over the panel for the test samples. FIGS. 15 and 16 show that the Core 1 sample representing an embodiment of the invention shows less flatness variation over the panel than the Core 2 sample.

The following table lists exemplary values of geometric properties for the Core 1 and Core 2 samples tested for resistance to changing climates.

TABLE 2

Geometric properties (absolute values of the parameter)

| Test parameter | Core 1 | Core 2 |
|---|---|---|
| Opening long side joints, Average in mm | 0.29 | 0.24 |
| Opening long side joints, Maximum in mm | 0.40 | 0.65 |
| Height differences long side joints, Average in mm | 0.08 | 0.06 |
| Height differences long side joints, Maximum in mm | 0.22 | 0.16 |
| Flatness over panel width, Average in mm | 0.15 | 0.17 |
| Flatness over panel width, Maximum in mm | 0.22 | 0.32 |
| Dimensional variation in the length, in % | 0.06 | 0.05 |
| Dimensional variation in the width, in % | 0.11 | 0.13 |

The following table compares the test results for Core 1 and Core 2 samples to the results of P2, P3, P5 samples.

TABLE 3

Comparison of results from resistance to changing climates testing

| Test parameter | Core 1 | Core 2 |
|---|---|---|
| Opening long side joints, AV in mm | average level | average level |
| Opening long side joints, Max. in mm | average level | average level |
| Height differences long side joints AV in mm | average level | average level |
| Height differences long side joints Max. in mm | average level | average level |
| Flatness over panel width AV in % | average level | average level |
| Flatness over panel width Max. in % | average level | average level |
| Dimensional variation in the length in % | average level | average level |
| Dimensional variation in the width in % | average level | average level |

The following table shows a comparison of the test results to the requirements under the EN 13489 standard (geometric properties without deposition with changing climates). The Core 2 sample does not fulfill the requirement for the flatness over panel width, maximum prescribed under the EN 13489 standard.

TABLE 4

Comparison of results from resistance to changing climates testing

| Sample | Property | Result | Requirements according to EN 13489 standard |
|---|---|---|---|
| Core 1 | Height differences long side joints Average | 0.07 mm | ≦0.20 mm |
| Core 2 |  | 0.04 mm |  |
| Core 1 | Height differences long side joints Maximum | 0.17 mm |  |
| Core 2 |  | 0.10 mm |  |
| Core 1 | Flatness over panel width Average | 0.04% | ≦0.20% |
| Core 2 |  | 0.04% |  |
| Core 1 | Flatness over panel width Maximum | 0.15% |  |
| Core 2 |  | 0.22% |  |

Thermal Conductivity

Tests to determine thermal resistance of the samples were carried out according to the EN12664 standard. The samples were categorized as a material, which is rectangular layered to the heat flow. The two-plate-device "TLP 900-H" was used to determine the thermal resistance. The samples were stored in a climate of 23° C. and 50% relative humidity up to mass stability. Directly after the storage, the specimens were tested. The results are shown in Table 5.

TABLE 5

Thermal Conductivity

| Sample | Thermal conductivity according to EN 12664 W/(m*K) |
|---|---|
| Core 1 | 0.116 |
| Core 2 | 0.118 |

Bond Quality

Tests to determine the bonding quality were carried out according to JAS II by the following steps:
1) 2 hours soaking in water bath at (70±3) ° C.,
2) 3 hours drying in oven at (60±3) ° C., until the sample weight was 102-105% of original weight,
3) Determination of delamination The results are shown in Table 6.

TABLE 6

Bonding quality

| Sample | Glue line length, mm | Delaminated glue line, mm between upper/middle layer | Delaminated glue line, mm between middle/lower layer | Delaminated rate, % between upper/middle layer | Delaminated rate, % between middle/lower layer |
|---|---|---|---|---|---|
| Core 1 | 300 | 0 | 0 | 0 | 0 |
| Core 2 | 298 | 29-75 | 0-10 | 9.7-25.2 | 0-3.3 |

The requirements based on the JAS II standard are:
1) Delamination rate same bonding layer must be less than ⅓ (33%) on every test piece; and
2) 90% of test pieces must pass.

Both Core 1 and Core 2 samples fulfill the requirements for JAS II immersion delamination test.

Impact Sound Insulation

Tests to determine impact sound insulation were carried out through a solid ceiling (reinforced concrete) with a thickness of 140 mm in accordance with DIN EN ISO 140-8 standard in the test stand of MFPA Leipzig GmbH. The volume of the space below the ceiling (reception room) was 63.5 m³. The measurement was carried out according to category II (large test specimen) of DIN EN ISO 140-8, March 1998 issue. The impact noise reduction was carried out according to DIN EN ISO 717-2 January 1997 issue. The impact noise level was measured two times at 3 positions of the standard tapping ma-chine parallel to each test specimen at the unfinished ceiling and one position of the standard tapping machine at each specimen. For the measurement a mobile microphone was used in the reception room below.

The measurement was carried out at average third-octave of 50-5000 Hz. The standard impact noise level results from the equation:

$$L_n = L + 10 \lg A/A_O \text{ in dB}$$

Where: $L_n$: standard impact noise level
L: impact noise level
A: equivalent absorption area in the reception room in m³, determined from the measurement of the reverberation period and the volume of the reception room
$A_O$ reference absorption area ($A_O$ is defined to 10 m³)

Impact noise reduction was determined from the difference of the standard impact noise level of the unfinished ceiling and the unfinished ceiling with flooring in accordance with the following equation:

$$\Delta L = L_{n,O} - L_n$$

Where:

ΔL: impact noise reduction $L_{n,O}$: standard impact noise level of the solid standard ceiling without the flooring applied $L_n$: standard impact noise level of the solid standard ceiling with the flooring applied Table 7 shows the standard impact noise levels for the Core 1 and Core 2 samples.

TABLE 7

Impact sound insulation

Standard impact noise level, dB

| Sample | Ceiling without parquet (Reference) | Ceiling with parquet | Impact noise reduction |
|---|---|---|---|
| Core 1 | 76 | 58 | 18 |
| Core 2 | | 59 | 17 |

Room Acoustical Properties

The test to determine room acoustical properties was performed in a test room, where a reinforced concrete slab (2.40 m×2.00 m) of a thickness of 12 mm in installed. There were carried out at least 15 measurements of the walking noise, which was emitted while a person walked consistently on the installed floor. The proband wore high-heeled shoes (hard rubber sole) for the test. For the characterization of the room acoustical properties the $1^{st}$ step of the test person on the floor is consulted. As measures for the emitted noise the A-weighted total sound pressure level (frequencies from 25 Hz to 12500 Hz) in dB(A) and the psycho acoustical loudness as Sone were used. Those were estimated according to IHD-Norm 431 in the version 04/2003 and the methods described therein.

Tables 8 and 9 compare the characteristics of the Core 1 and Core 2 samples. The test results are given as the difference of the total sound pressure level/loudness of the tested sample and the according values of the IHD-reference flooring (DPL-laminate flooring (7 mm), PE-foam (3 mm), PE-foil (0.2 mm)). The differences of the total sound pressure levels are assessed as follows:

+0.5 dB (A)—variations only perceptible under very good acoustical conditions

+1.0 dB (A)—perceptible threshold for improvements

+3.0 dB (A)—bisection of the signal energy

+6.0 dB (A)—bisection of the sound pressure level

+10.0 dB (A)—bisection of the subjective sound intensity

The change of the linear measure loudness (N) is calculated in relation to the reference using the term:

$$\text{Percentage changing } \frac{(N_{ref} - N_j)}{N_{ref}} * 100\%$$

This value gives the increasing (negative value) or decreasing (positive value) of the loudness perception in percent.

TABLE 8

A-weighted total sound pressure level

| Sample | Reference (averaged spectrum) ($[L_{total, ref}]$ = dB (A)) | Sample (averaged spectrum) ($[L_{total, j}]$ = dB (A)) | Difference ΔL = $L_{total, ref} - L_{total, j}$ ($[\Delta L]$ = dB (A)) |
|---|---|---|---|
| 1 | 73.1 | 69.6 | 3.5 |
| 2 | 73.1 | 71.6 | 1.5 |

TABLE 9

Loudness

| Sample | Reference (averaged spectrum) ($[N_{ref}]$ = Sone) | Sample (averaged spectrum) ($[N_j]$ = Sone) | | Difference of the loudness-values as Sone/rel. difference, % |
|---|---|---|---|---|
| 1 | 22.2 | 20.1 | 2.1 | 9.3 |
| 2 | 22.2 | 21.7 | 0.5 | 2.1 |

What is claimed is:

1. A method of making a composite floor board, comprising:

forming a composite veneer panel by bonding a plurality of veneer layers together such that grain orientations of each layer are unidirectional in a first horizontal direction, wherein glue layers are formed between the veneer layers and extend horizontally;

sawing the composite veneer panel into a plurality of wooden veneer structures after forming the composite veneer panel;

assembling a core layer, after sawing the veneer panel, by arranging the plurality of wooden veneer structures such that the glue layers of the wooden veneer structures extend vertically while grain directions of each wooden veneer structure remain extending in the first horizontal direction;

bonding a top layer having a wood grain orientation in a second horizontal direction to a first surface of the core layer to form a floor board, wherein second horizontal direction is perpendicular to the first horizontal direction; and processing at least one edge of the floor board, after bonding, to form a coupling profile, wherein the glue layers of the wooden veneer structures provide a moisture barrier for the floor board.

2. The method of claim 1, wherein the core layer has a second surface opposing the first surface; and further comprising:

bonding a third layer to the second surface of the core layer wherein the third layer has a wood grain orientation in the same direction with the grain orientation in the top layer and perpendicular to the grain orientation in the core layer.

3. The method of claim 1, wherein the core layer has a second surface opposing the first surface; and further comprising:

bonding a plurality of third layers together; and bonding the plurality of third layers to the second surface of the core layer; the plurality of third layers comprising two layers comprising one layer of either wooden veneer, thin HDF board, thin plywood, or any other substrate material, bonded to another layer having a grain orientation in the same direction with the top layer's grain orientation, wherein the bottom of the plurality of the third layers has wood grain orientation in the same direction with the top layer's and perpendicular to the core layer's grain orientation.

4. The method of claim 1, further comprising:
bonding a third layer to the top and core layers; and
bonding a fourth layer in between the top and core layers, wherein the fourth layer is of either wooden veneer, thin HDF board, thin plywood, or any other substrate material, thus forming a multi-layer composite board wherein the third layer has wood grain orientation in the same direction with the top layer's and perpendicular to the core layer's grain orientation.

5. The method of claim 1, wherein the wooden veneer structures are each 12-50 mm wide in the second horizontal direction.

6. The method of claim 1, wherein processing at least one edge of the floor board comprises forming one of: tongues, grooves, or locking profiles.

7. The method of claim 6, further comprising:
applying a UV cured surface finish to the top layer; and
UV curing the surface finish,
wherein the floor board is thereafter finished and ready to be installed.

8. The method of claim 7, wherein the floor board is assembled by said method in a manner such that the floor board has less than a 0.07% variation in length after 2 weeks of being in an environment of 85% relative humidity and 23° C.

9. The method of claim 8, wherein the floor board is assembled by said method in a manner such that the floor board has less than a 0.12% variation in width after 2 weeks of being in an environment of 85% relative humidity and 23° C.

10. The method of claim 9, wherein the floor board is assembled by said method in a manner such that the floor board has less than a 0.20% variation in average flatness over panel width after 2 weeks of being in an environment of 85% relative humidity and 23° C.

11. The method of claim 1, wherein the top layer comprises a single piece of sawn cut veneer.

12. The method of claim 1, wherein the wooden veneer structures are manufactured from a sustainable plantation wood species.

13. The method of claim 12, wherein the sustainable plantation wood species are ten to fifteen years old.

* * * * *

UNITED STATES PATENT AND TRADEMARK OFFICE
CERTIFICATE OF CORRECTION

PATENT NO.        : 8,202,389 B2
APPLICATION NO.   : 11/763823
DATED             : June 19, 2012
INVENTOR(S)       : Daniel Nugroho Handojo Page 1 of 1

It is certified that error appears in the above-identified patent and that said Letters Patent is hereby corrected as shown below:

In the Claims:

In column 12, claim 1, line 11, before "veneer panel" please insert --composite--.

Signed and Sealed this
Fourth Day of September, 2012

David J. Kappos
*Director of the United States Patent and Trademark Office*